(12) United States Patent
Takahashi et al.

(10) Patent No.: US 11,828,345 B2
(45) Date of Patent: Nov. 28, 2023

(54) ONE-WAY CLUTCH AND ONE-WAY CLUTCH-EQUIPPED ROTATING DAMPER DEVICE

(71) Applicant: SIMOTEC CO., LTD., Higashiosaka (JP)

(72) Inventors: Yoshiharu Takahashi, Higashiosaka (JP); Tetsushi Shimonishi, Higashiosaka (JP)

(73) Assignee: SIMOTEC CO., LTD., Higashiosaka (JP)

( * ) Notice: Subject to any disclaimer, the term of this patent is extended or adjusted under 35 U.S.C. 154(b) by 524 days.

(21) Appl. No.: 15/734,099

(22) PCT Filed: May 20, 2019

(86) PCT No.: PCT/JP2019/019955
§ 371 (c)(1),
(2) Date: Dec. 1, 2020

(87) PCT Pub. No.: WO2019/239807
PCT Pub. Date: Dec. 19, 2019

(65) Prior Publication Data
US 2021/0215218 A1 Jul. 15, 2021

(30) Foreign Application Priority Data
Jun. 11, 2018 (JP) .................. 2018-111279

(51) Int. Cl.
*F16F 9/12* (2006.01)
*F16D 41/18* (2006.01)
*E05F 3/14* (2006.01)

(52) U.S. Cl.
CPC ............ *F16F 9/12* (2013.01); *F16D 41/18* (2013.01); *E05F 3/14* (2013.01); *E05Y 2201/266* (2013.01);
(Continued)

(58) Field of Classification Search
CPC ......... F16F 9/12; F16F 2232/02; F16D 41/18; E05F 3/14; E05Y 2201/266; E05Y 2900/614
(Continued)

(56) References Cited

U.S. PATENT DOCUMENTS 2,905,294 A 9/1959 Kellogg
6,102,179 A * 8/2000 Hodson .................. F16D 41/18
192/41 R
(Continued)

FOREIGN PATENT DOCUMENTS

DE 102013227008 A1 6/2015
GB 319607 A 2/1930
(Continued)

OTHER PUBLICATIONS

International Search Report for International Application No. PCT/JP2019/019955; dated Jul. 9, 2019.
(Continued)

*Primary Examiner* — Christopher P Schwartz
(74) *Attorney, Agent, or Firm* — CANTOR COLBURN LLP

(57) ABSTRACT

The present invention addresses the problem of providing a one-way clutch and a one-way clutch-equipped rotating damper device with which it is possible to achieve size reduction. A pawl portion of a slide member comprises a withdrawal surface and an engaging surface. When a gear member rotates toward one side, as inner teeth and the withdrawal surface abut each other, the slide member slides in a sliding direction and the pawl portion is withdrawn from the inner teeth, whereby the gear member rotates independently of a rotor shaft. When the gear member rotates toward the other side as the inner teeth and the engaging surface abut each other, the inner teeth and the engaging surface
(Continued)

become engaged, whereby the gear member and the rotor shaft rotate integrally.

30 Claims, 13 Drawing Sheets

(52) U.S. Cl.
CPC ..... *E05Y 2900/614* (2013.01); *F16F 2232/02* (2013.01)

(58) Field of Classification Search
USPC .................................................. 188/290–296
See application file for complete search history.

(56) References Cited

U.S. PATENT DOCUMENTS

| | | | |
|---|---|---|---|
| 9,080,628 | B2 | 7/2015 | Shumozaki |
| 9,103,390 | B2 | 8/2015 | Shimozaki |
| 11,493,098 | B2 * | 11/2022 | Yasui ........................ F16F 9/12 |
| 2003/0050121 | A1 | 3/2003 | Takada et al. |
| 2003/0150678 | A1 | 8/2003 | Iwashita |
| 2003/0234145 | A1 | 12/2003 | Iwashita |
| 2009/0308385 | A1 * | 12/2009 | Brewer ............... A61M 15/009 128/203.12 |
| 2011/0299366 | A1 * | 12/2011 | Giacobino .............. F16D 41/18 192/45.1 |
| 2014/0001007 | A1 | 1/2014 | Shimozaki |
| 2014/0083809 | A1 | 3/2014 | Shimozaki |
| 2015/0267480 | A1 | 9/2015 | Meek |

FOREIGN PATENT DOCUMENTS

| | | |
|---|---|---|
| JP | S5117655 U | 2/1976 |
| JP | H10501869 A | 2/1998 |
| JP | 2003156066 A | 5/2003 |
| JP | 2003214474 A | 7/2003 |
| JP | 2003287072 A | 10/2003 |
| JP | 2012180917 A | 9/2012 |
| JP | 5666376 B2 | 2/2015 |

OTHER PUBLICATIONS

International Preliminary Report on Patentability for International Application No. PCT/JP2019/019955; dated Jul. 9, 2020.
JPO Notice of Reasons for Refusal for corresponding JP Application No. 2018-111279; dated Jul. 12, 2022.

* cited by examiner

ONE-WAY CLUTCH AND ONE-WAY CLUTCH-EQUIPPED ROTATING DAMPER DEVICE

CROSS REFERENCE TO RELATED APPLICATIONS

This is the U.S. national stage of application No. PCT/JP2019/019955, filed on May 20, 2019. Priority under 35 U.S.C. § 119(a) and 35 U.S.C. § 365(b) is claimed from Japanese Application No. 2018-111279, filed Jun. 11, 2018, the disclosure of which is also incorporated herein by reference.

TECHNICAL FIELD

The present invention relates to a one-way clutch and a one-way clutch-equipped rotating damper device.

BACKGROUND ART

Conventionally, there is known a rotating damper that is provided, for example, at an opening/closing part of a door or the like, and is used for slowly operating the door or the like that is biased in either an opening direction or a closing direction to mitigate a shock. In such a rotating damper, a one-way clutch-equipped rotating damper device may be structured in combination with a one-way clutch in order to generate damping force for rotation in only one direction.

For example, in a one-way clutch-equipped rotating damper device described in Patent Literature 1, a one-way clutch is combined with a rotating damper device. The one-way clutch has an inner member that is coupled to a rotor shaft of a rotating damper and rotates integrally with the rotor shaft, an outer member that houses the inner member in a relatively rotatable manner and has an external gear formed on an outer peripheral surface, and a pair of planetary gears interposed between the inner member and the outer member.

In this one-way clutch, a planetary gear meshes with an internal gear formed on an inner peripheral surface of the outer member, and is housed in a recess formed on the inner member. The recess of the inner member includes a first wall that is arranged on one side of rotational directions of the inner member with respect to the planetary gear and extends outside of the inner member in a radial direction, and a second wall that is arranged on an other side of rotational directions of the inner member with respect to the planetary gear. The second wall extends outside of the inner member in the radial direction by about half length of extension of the first wall, and has a corner portion at an extended end portion.

Then, when the outer member rotates toward the one side (a positive direction) with respect to the inner member, the planetary gear rotated by the internal gear of the outer member abuts the first wall, and idly rotates while slidingly contacting on the first wall. In this case, because the first wall extends, in the radial direction, outside of a position where a tooth tip of the planetary gear abuts, the planet gear does not mesh with an outer end portion of the first wall, and idly rotates on the first wall. With this arrangement, the inner member does not rotate even if the outer member rotates.

Meanwhile, when the outer member rotates toward the other side (a negative direction) with respect to the inner member, the planetary gear rotated by the internal gear of the outer member moves toward the second wall, meshes with the corner portion of the second wall, and becomes unable to rotate. With this arrangement, the inner member engages with the outer member via the planetary gear and rotates integrally with the outer member.

CITATIONS LIST

Patent Literature

Patent Literature 1: JP-B2 5666376 Gazette

SUMMARY OF INVENTION

Technical Problems

The above-described one-way clutch is structured to interpose a plurality of planetary gears between the outer member and the inner member and, by using the planetary gears, switches between a state in which the outer member and the inner member engage with each other, and a state in which the outer member and the inner member do not engage with each other.

Thus, the one-way clutch described in Patent Literature 1 is generally large due to having a structure in which the plurality of planetary gears is housed inside the outer member.

Therefore, the present invention provides a one-way clutch and a one-way clutch-equipped rotating damper device that can reduce a size of the one-way clutch.

Solutions to Problems

A one-way clutch and a one-way clutch-equipped rotating damper device that solve the above problem have the following features.

That is, the one-way clutch included in the one-way clutch-equipped rotating damper device includes a rotary shaft rotatable around a shaft center, a slide member that is supported by the rotary shaft slidably to a radial direction orthogonal to a direction of the shaft center, is rotatable around the shaft center integrally with the rotary shaft, and has, on both end portions of a sliding direction, pawl portions projecting outward in the radial direction, and a gear member having a cylindrical member that is supported by the rotary shaft relatively rotatable around the shaft center and houses the slide member, a plurality of outer teeth projecting outward in the radial direction from an outer peripheral surface of the cylindrical member, and a plurality of inner teeth projecting inward in the radial direction from an inner peripheral surface of the cylindrical member, in which a groove portion is formed in one of an outer peripheral surface of the rotary shaft and one side of an inner peripheral surface of the cylindrical member in the gear member, a protrusion portion fittable to the groove portion is formed on the other one of the outer peripheral surface of the rotary shaft and the inner peripheral surface of the cylindrical member in the gear member, the gear member is supported by the rotary shaft by the groove portions and the protrusion portions fitting to each other, a dimension between a tip end of one pawl portion and a tip end of another pawl portion is more than a diameter of a circle that is centered at the shaft center and passes through the tip ends of the plurality of inner teeth, the pawl portion has a withdrawal surface that abuts the inner teeth by the gear member rotating toward one side with respect to the rotary shaft and an engaging surface that abuts the inner teeth by the gear member rotating toward an other side with respect to the rotary shaft, the slide member slides in the sliding direction, the pawl portion withdraws from the inner teeth and the gear member rotates independently of the rotary shaft in a case where the inner teeth and the withdrawal surface abut each other when the gear member rotates toward the one side, and the inner teeth and the engaging surface engage with each other and the gear member and the rotary shaft rotate integrally in a case where the inner teeth and the engaging surface abut each other when the gear member rotates toward the other side.

The rotary shaft has a plurality of shaft piece portions divided in a circumferential direction by a slit formed along a direction of the shaft center from a tip end portion of the rotary shaft, and the groove portion is formed in an outer peripheral surface of the shaft piece portions, the slit is provided to bend the shaft piece portions when the protrusion portion is fitted to the groove portion.

With this arrangement, it is possible to reduce a size of the one-way clutch. Furthermore, the number of parts included in the one-way clutch can be reduced, furthermore, with this arrangement, the shaft piece portions are bent when the protrusion portion of the gear member is fitted to the groove portion of the rotary shaft, and fitting work can be facilitated.

Furthermore, the rotary shaft has an insertion hole into which the slide member is slidably inserted, the insertion hole penetrating in the radial direction, the insertion hole is arranged at the base end side of the rotary shaft with respect to the slit.

With this arrangement, it possible to support the slide member with a simple structure.

Furthermore, the withdrawal surface is formed on an inclined surface inclining to a downstream side as going outward in the radial direction with respect to a direction of the gear member rotating toward the one side, and the engaging surface is formed on an inclined surface inclining to an upstream side as going outward in the radial direction with respect to a direction of the gear member rotating toward the other side.

With this arrangement, the pawl portion can smoothly withdraw from an inner tooth as the gear member rotates toward the one side. Furthermore, a state of the inner tooth and the pawl portion being engaged with each other can be easily maintained when the gear member rotates toward the other side with respect to the rotary shaft.

Furthermore, the inner tooth has a first surface that abuts the pawl portion by the gear member rotating toward the one side with respect to the rotary shaft and a second surface that abuts the pawl portion by the gear member rotating toward the other side with respect to the rotary shaft. The first surface is formed on an inclined surface inclining to the downstream side as going outward in the radial direction with respect to the direction of the gear member rotating toward the one side, and the second surface is formed on an inclined surface inclining to the upstream side as going outward in the radial direction with respect to the direction of the gear member rotating toward the other side.

With this arrangement, the pawl portion can further smoothly withdraw from the inner tooth of the pawl portion when the gear member rotates toward the one side. Furthermore, the inner tooth and the pawl portion can reliably engage with each other when the gear member rotates toward the other side with respect to the rotary shaft.

Furthermore, the slide member has a pair of side surfaces that extends along a sliding direction between the pawl portions of the both end portions, the pair of side surfaces slide abutting each inner surface of the insertion holes.

Furthermore, the one-way clutch-equipped rotating damper device may include the one-way clutch according to any one of claims 1 to 6, a housing into which the rotary shaft of the one-way clutch is inserted, a rotor blade that is housed in the housing and rotatable around the shaft center integrally with the rotary shaft, and viscous fluid that is enclosed in the housing and provides rotational resistance to the rotor blade.

With this arrangement, the gear member can be structured with fewer outer teeth. Therefore, when a gear that transmits rotational force to the rotary shaft is meshed with the outer teeth, rotational resistance with respect to the rotary shaft generated in the one-way clutch-equipped rotating damper device can be increased by increasing a rotation rate of the rotary shaft, by which usability of the one-way clutch-equipped rotating damper device connected to the one-way clutch can be improved.

Advantageous Effects of Invention

According to at least an embodiment the present invention, it is possible to reduce a size of the one-way clutch.

BRIEF DESCRIPTION OF DRAWINGS

FIG. 7A is a diagram illustrating a state where one pawl portion is positioned outside of a circle C in the radial direction, and an inner tooth abuts the one pawl portion, and FIG. 7B is a diagram illustrating a state where the one pawl portion pressed by the inner tooth has withdrawn inward in the radial direction.

FIG. 9A is a diagram illustrating a state where one pawl portion is positioned outside of the circle C in the radial direction, and FIG. 9B is a diagram illustrating a state where an inner tooth engages with the one pawl portion.

DESCRIPTION OF EMBODIMENTS

Figure 1:
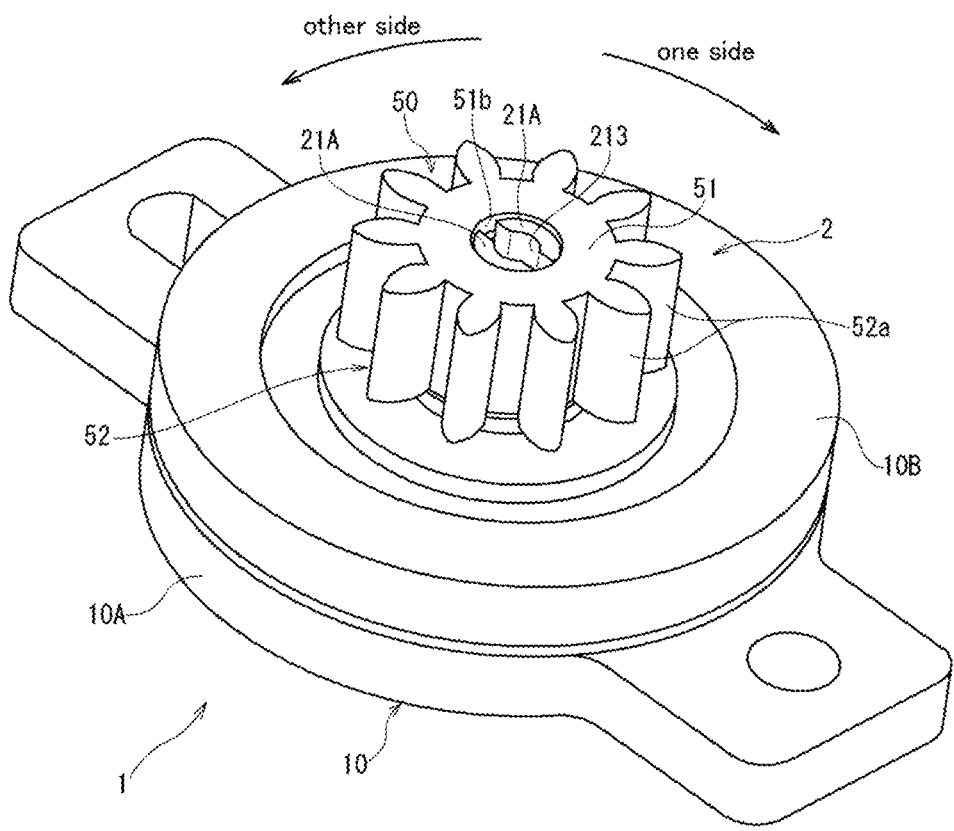
FIG. 1 is a perspective view illustrating a one-way clutch-equipped rotating damper device.
Figure 2:
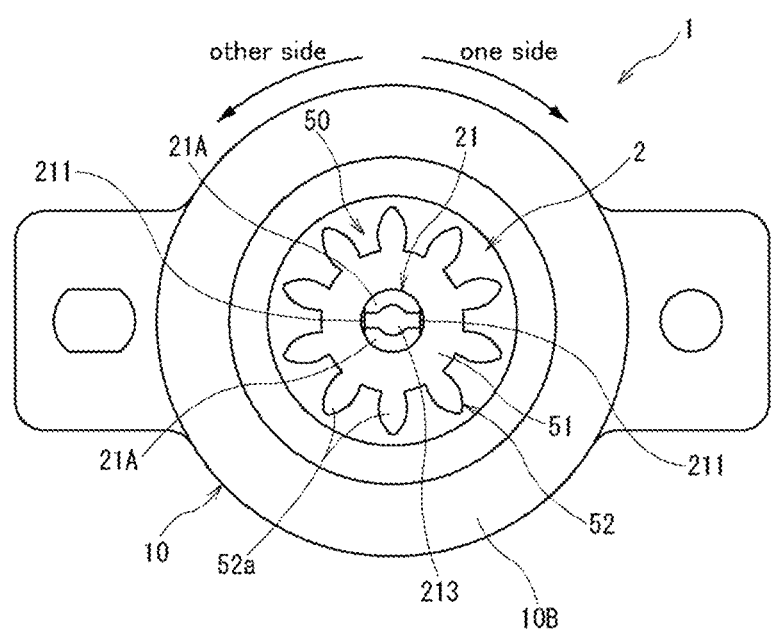
FIG. 2 is a plan view illustrating the one-way clutch-equipped rotating damper device.

Next, an embodiment of the present invention will be described with reference to the accompanying drawings.

[One-Way Clutch-Equipped Rotating Damper Device]

A one-way clutch-equipped rotating damper device 1 (hereinafter, simply referred to as "rotating damper device 1") 1 illustrated in FIGS. 1 to 4 is an embodiment of the one-way clutch-equipped rotating damper device according to the present invention.

The rotating damper device 1 is provided in, for example, an opening/closing part of an opening/closing door that is rotatably coupled to a main body of OA equipment, such as a small printer, and is used to generate damping force when the opening/closing door rotates in either an opening direction or a closing direction. The rotating damper device 1 is not limited to this, and can be provided in a rotation part of a second member rotatably coupled to a first member.

The rotating damper device 1 includes a housing 10, a rotor blade 25, a rotor shaft 20, a slide member 30, a gear member 50, and viscous fluid 60.

In the rotating damper device 1, a one-way clutch 2 includes the rotor shaft 20, the slide member 30, and the gear member 50. That is, the rotating damper device 1 is structured by connecting the one-way clutch 2 to the rotating damper device that provides rotational resistance to the rotor shaft 20. The rotor shaft 20 is an example of a rotary shaft rotatable around a shaft center.

The housing 10 has a housing main body 10A and a lid body 10B.

The housing main body 10A is formed in a bottomed cylindrical shape and has a bottom face 11. At a central portion of the bottom face 11, a support shaft 12 having a columnar shape and projecting inside the housing main body 10A is formed along a direction of a shaft center P. In the housing main body 10A, an opening 13 is formed at an end portion opposite to the bottom face 11 with respect to the direction of the shaft center P.

The lid body 10B occludes the opening 13 of the housing main body 10A. At a central portion of the lid body 10B, a through hole 14 having a circular shape and penetrating in the direction of the shaft center P is formed.

The rotor blade 25 is formed substantially disk-shaped, and housed in the housing main body 10A so as to be rotatable around the shaft center P. A bearing hole 23 is formed on a surface facing the bottom face 11 at a central portion of the rotor blade 25. The bearing hole 23 is structured to be fittable to the support shaft 12 of the housing main body 10A. The rotor 20 is rotatably supported by the housing 10 by the bearing hole 23 being rotatably fitted to the support shaft 12.

The rotor shaft 20 extends from the central portion of the rotor blade 25 toward one side of the direction of the shaft center P and is structured to be rotatable around the shaft center P. The rotor shaft 20 is structured to be rotatable integrally with the rotor blade 25. The rotor shaft 20 extends from an inside of the housing 10 to an outside of the housing 10 through the through hole 14 of the lid body 10B.

The rotor shaft 20 has a portion inserted into the housing 10 and a portion projecting outside of the housing 10. The portion of the rotor shaft 20, which projects outside of the housing 10, is an extension shaft 21. The extension shaft 21 is formed in a substantially columnar shape having an outer peripheral surface chamfered on two sides, and has a pair of chamfered portions 211. The pair of chamfered portions 211 is formed in a flat shape and is arranged in parallel to each other.

As illustrated in FIGS. 3 to 5A and 5B, an insertion hole 212 that penetrates the extension shaft 21 in the radial direction is formed in the extension shaft 21. The insertion hole 212 is formed with respect to a direction in which the pair of chamfered portion 211 and chamfered portion 211 communicate with each other.

The extension shaft 21 has a plurality of shaft piece portions 21A divided in a circumferential direction by a slit 213 formed toward the housing 10 with respect to the direction of the shaft center P from a tip end portion (an end portion opposite to the housing 10 with respect to the direction of the shaft center P) of the extension shaft 21. That is, the tip end portion of the extension shaft 21 is divided into a plurality of shaft piece portions 21A by the slit 213.

In the present embodiment, the slit 213 extends, with respect to the radial direction, in parallel to a direction in which the insertion hole 212 is formed, and divides the tip end portion of the extension shaft 21 into two shaft piece portions 21A. However, the tip end portion of the extension shaft 21 can be divided into three or more shaft piece portions 21A.

In an outer peripheral surface of a shaft piece portion 21A of the extension shaft 21, a groove portion 214 recessed inward in the radial direction is formed. The groove portion 214 extends along the circumferential direction. In the present embodiment, the groove portion 214 is formed over an entire area of the shaft piece portion 21A with respect to the circumferential direction.

The viscous fluid 60 is enclosed in the housing 10. The viscous fluid 60 provides rotational resistance to the rotor blade 25, which is housed in the housing main body 10A and rotates around the shaft center P, and to the rotor shaft 20 that rotates integrally with the rotor blade 25.

For example, the viscous fluid 60 is a viscous fluid such as silicone oil. The magnitude of the rotational resistance provided to the rotor blade 25 can be adjusted by appropriately changing the viscosity of the viscous fluid 60 and a shape of the rotor blade 25.

A seal member 15 such as an O-ring is interposed between the rotor shaft 20 and the lid body 10B to prevent the viscous fluid 60 from leaking from between the rotor shaft 20 and the lid body 10B.

As illustrated in FIGS. 1 to FIG. 4 and FIG. 6, the gear member 50 is structured to be rotatable around the shaft center P toward the one side and the other side opposite to the one side, and has a gear main body 51, an outer tooth gear 52, and inner teeth 53.

The gear main body 51 is formed by a cylindrical member supported by the rotor shaft 20 relatively rotatable around the shaft center P. The outer tooth gear 52 has a plurality of outer teeth 52a that projects outward in the radial direction from an outer peripheral surface of the gear main body 51 and is arranged along the circumferential direction. A plurality of inner teeth 53 projects inward in the radial direction from an inner peripheral surface of the gear main body 51 and is provided along the circumferential direction.

The gear main body 51 has a housing portion 51a, which is formed with the inner teeth 53 and houses the slide member 30, and has a support portion 51b, which has a smaller diameter than a diameter of the housing portion 51a and is supported by the rotor shaft 20. The housing portion 51a is arranged closer to the housing 10 than the support portion 51b is with respect to the direction of the shaft center P. An inner diameter of the support portion 51b of the gear main body 51 and an outer diameter of the extension shaft 21 are formed to have substantially the same dimension, and the extension shaft 21 can be inserted into the support portion 51b.

On an inner peripheral surface of the support portion 51b, a protrusion portion 55 that projects inward in the radial direction is formed. The protrusion portion 55 extends along the circumferential direction. In the present embodiment, the protrusion portion 55 is formed over an entire area of the inner peripheral surface of the support portion 51b with respect to the circumferential direction.

The protrusion portion 55 is structured to be fittable to the groove portion 214 of the rotor shaft 20, and the gear member 50 is supported by the rotor shaft 20 by the extension shaft 21 being inserted into the support portion 51b to fit the protrusion portion 55 and the groove portion 214 to each other.

In the present embodiment, the groove portion 214 is formed in the rotor shaft 20, and the protrusion portion 55 is formed on the support portion 51b of the gear main body 51. However, it is also possible to cause the rotor shaft 20 to support the gear member 50 by forming, on the rotor shaft 20, a protrusion portion that projects outward in the radial direction, forming, in the support portion 51b of the gear main body 51, a groove portion that recesses outward in the radial direction, and fitting the protrusion portion and the groove portion.

An inner tooth 53 has a first surface 53a arranged at the downstream side with respect to a direction of the gear member 50 rotating toward the one side, and a second surface 53b arranged closer to the upstream side than the first surface 53a is with respect to a direction of the gear member 50 rotating toward the one side. The first surface 53a is formed on an inclined surface inclining to the downstream side as going outward in the radial direction with respect to a direction of the gear member 50 rotating toward the one side. The second surface 53b is formed on an inclined surface inclining to the upstream side as going outward in the radial direction with respect to a direction of the gear member 50 rotating toward the other side.

The inner teeth 53 are arranged at equal intervals along the circumferential direction of the gear member 50. The inner teeth 53 are formed such that a center of the circle C passing through a tip end (a boundary between the first surface 53a and the second surface 53b) of each of the inner teeth 53 is the shaft center P (refer to FIG. 6).

Figure 3:
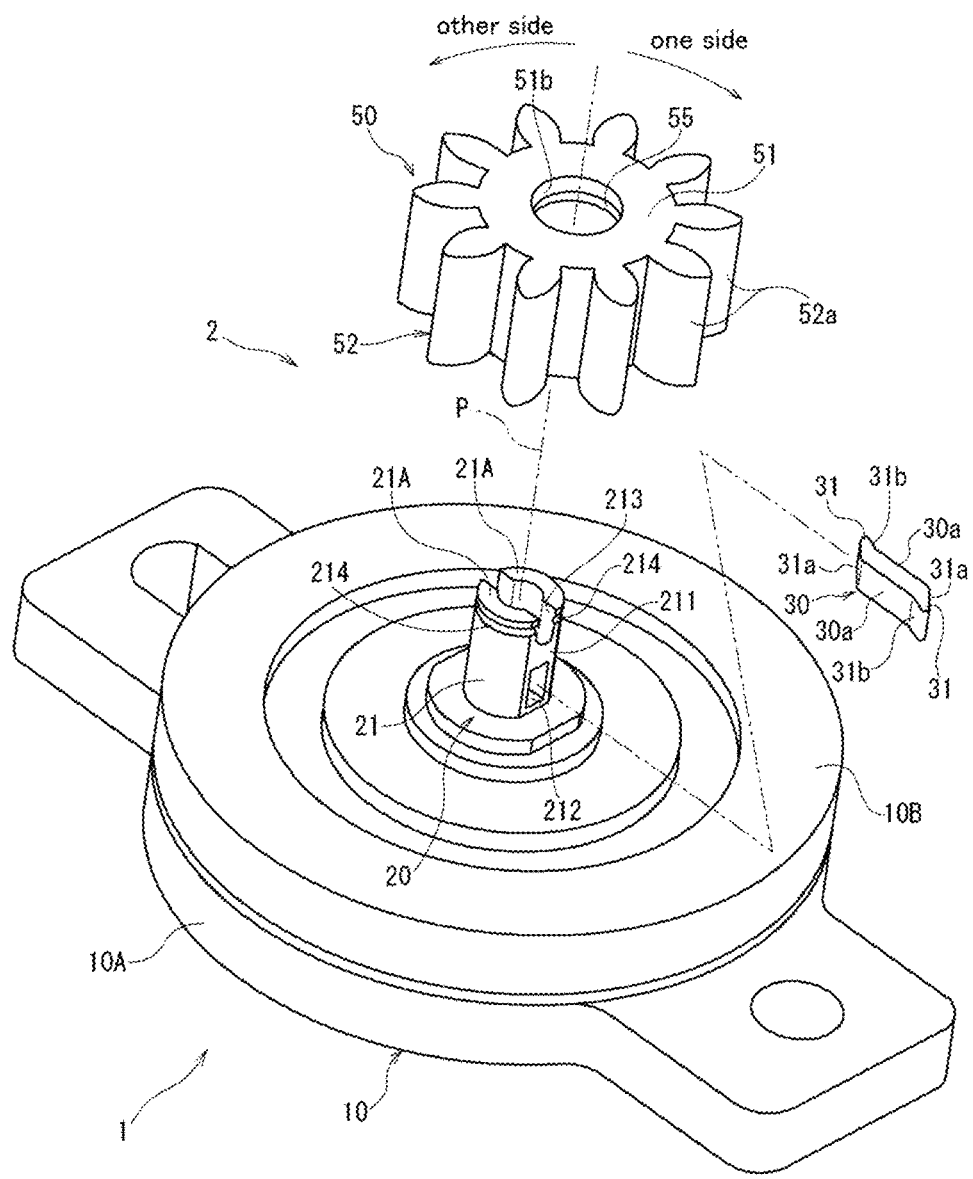
FIG. 3 is an exploded perspective view illustrating the one-way clutch-equipped rotating damper device.
Figure 4:
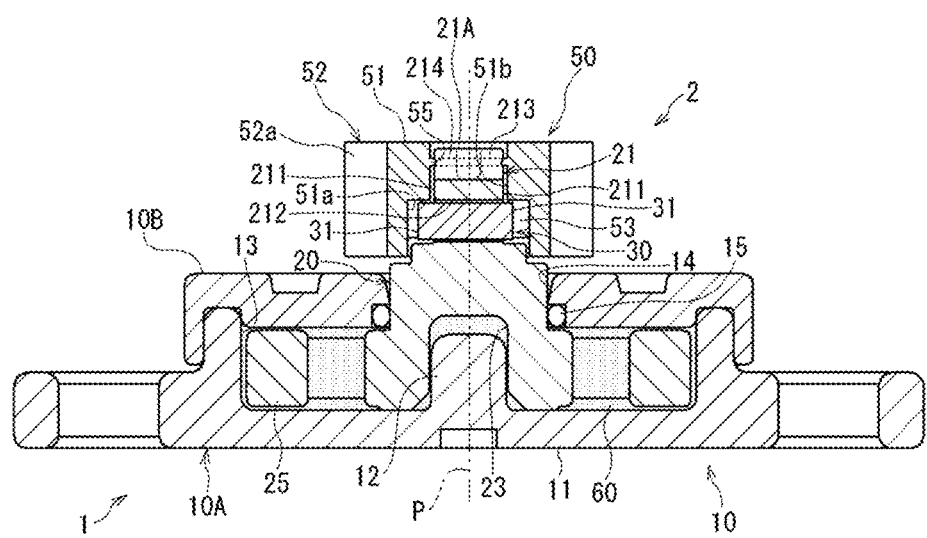
FIG. 4 is a cross-sectional side view illustrating the one-way clutch-equipped rotating damper device.
Figure 5A:
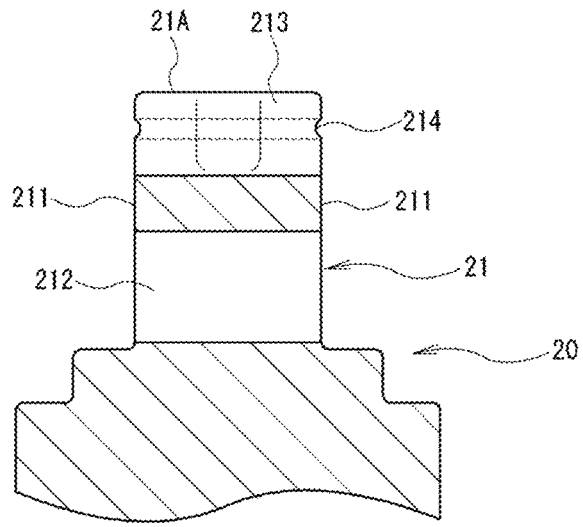
FIG. 5A is a cross-sectional side view illustrating a rotor shaft.
Figure 5B:
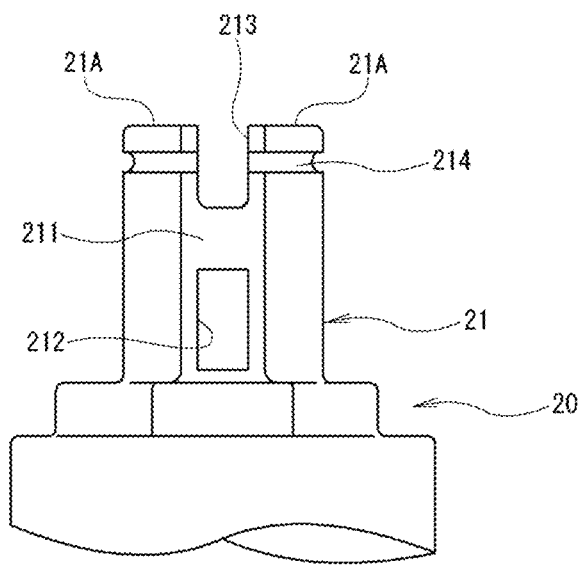
FIG. 5B is a front view illustrating the rotor shaft.
Figure 6:
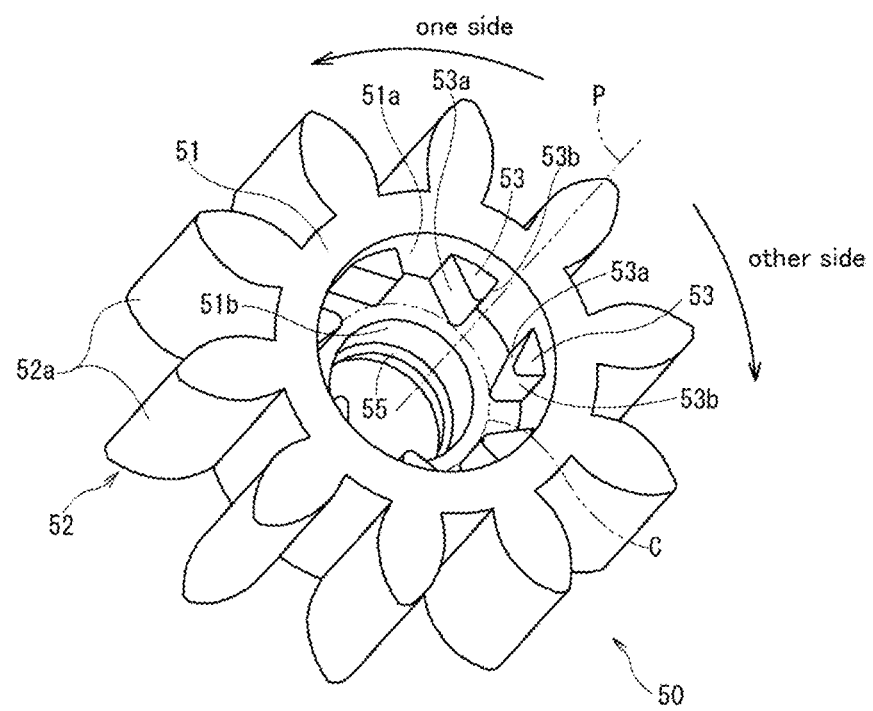
FIG. 6 is a perspective view illustrating a gear member as viewed from a bottom face side.

As illustrated in FIGS. 3 and 4, the slide member 30 is formed with a rod-shaped member and is slidably inserted into the insertion hole 212 of the extension shaft 21 in the radial direction orthogonal to the direction of the shaft center P. The slide member 30 is supported by the rotor shaft 20 by being inserted into the insertion hole 212, and is structured to be rotatable integrally with the rotor shaft 20 around the shaft center P. The slide member 30 has a pair of side surfaces 30a that extends along a sliding direction.

The slide member 30 has pawl portions 31 projecting outward in the radial direction at both end portions with respect to the sliding direction.

Figure 7A:
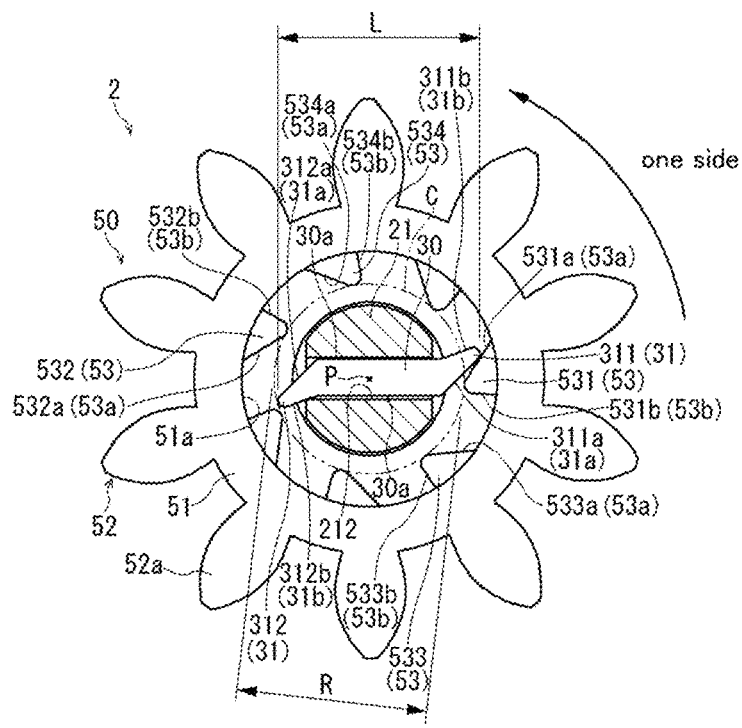
FIG. 7A and FIG. 7B are diagrams illustrating operation of a one-way clutch in a case where the gear member rotates toward one side with respect to the rotor shaft.

As illustrated in FIG. 7A, a pawl portion 31 has a withdrawal surface 31a arranged at the upstream side with respect to a direction of the gear member 50 rotating toward the one side, and an engaging surface 31b arranged closer to the downstream side than the withdrawal surface 31a is with respect to the direction of the gear member 50 rotating toward the one side. The withdrawal surface 31a is formed on an inclined surface inclining to the downstream side as going outward in the radial direction with respect to the direction of the gear member 50 rotating toward the one side. The engaging surface 31b is formed on an inclined surface inclining to the upstream side as going outward in the radial direction with respect to the direction of the gear member 50 rotating toward the other side.

A pawl portion 31 projects further than a side surface 30a toward the engaging surface 31b with respect to a direction orthogonal to the sliding direction of the slide member 30 and orthogonal to the side surface 30a. That is, the pawl portion 31 projects toward the downstream side further than the side surface 30a with respect to a direction of the gear member 50 rotating toward the one side.

As illustrated in FIG. 7A, the slide member 30 is formed such that a dimension L between a tip end of one pawl portion 31 and a tip end of another pawl portion 31 is more than a diameter R of the circle C. Therefore, irrespective of a slide position of the slide member 30 with respect to the rotor shaft 20, at least either one of pawl portions 31 is positioned outside of the circle C in the radial direction.

A withdrawal surface 31a of a pawl portion 31 abuts an inner tooth 53 of the gear member 50 by the gear member 50 rotating toward the one side with respect to the rotor shaft 20, and an engaging surface 31b of a pawl portion 31 abuts an inner tooth 53 of the gear member 50 by the gear member 50 rotating toward the other side with respect to the rotor shaft 20.

Furthermore, a first surface 53a of an inner tooth 53 of the gear member 50 abuts a pawl portion 31 of the slide member 30 by the gear member 50 rotating toward the one side with respect to the rotor shaft 20, and abuts a pawl portion 31 of the slide member 30 by the gear member 50 rotating toward the other side with respect to the rotor shaft 20.

[Operation of One-Way Clutch by One-Way Clutch-Equipped Rotating Damper Device]

The one-way clutch 2 in the rotating damper device 1 structured as described above operates as follows.

It should be noted that, in the following description of the operation of the one-way clutch 2, of the pawl portions 31 formed at both end portions of the slide member 30, one pawl portion 31 is referred to as a pawl portion 311, and another pawl portion 31 is referred to as a pawl portion 312. Each of the inner teeth 53 of the gear member 50 is referred to as an inner tooth 531, an inner tooth 532, an inner tooth 533, and an inner tooth 534 as appropriate, in order of the inner teeth 53 abutting a pawl portion 31 when the gear member 50 is rotated toward the one side further than the state illustrated in FIG. 7A.

First, operation of the one-way clutch 2 in a case where the gear member 50 rotates toward the one side with respect to the rotor shaft 20 will be described.

FIG. 7A illustrates a state where the pawl portion 311 is positioned outside of the circle C in the radial direction, and the pawl portion 312 does not protrude outside of the circle C in the radial direction. In the state illustrated in FIG. 7A, the inner tooth 531 is positioned closer to the upstream side than the pawl portion 311 is with respect to the direction of the gear member 50 rotating toward the one side.

When the gear member 50 rotates toward the one side with respect to the rotor shaft 20 in this state, the inner tooth 531 of the gear member 50 abuts the pawl portion 311. When the gear member 50 rotates toward the one side after the inner tooth 531 abuts the pawl portion 311, the pawl portion 311 is pressed by the inner tooth 531 and the pawl portion 311 withdraws from the inner tooth 531 inward in the radial direction, and the slide member 30 slides toward the pawl portion 312.

In this case, a first surface 531a of an inner tooth 531 abuts a withdrawal surface 311a of the pawl portion 311. However, because the withdrawal surface 311a is formed on an inclined surface inclining to the downstream side as going outward in the radial direction with respect to the direction of the gear member 50 rotating toward the one side, the pawl portion 311 can smoothly withdraw from the inner tooth 531 as the gear member 50 rotates toward the one side.

Furthermore, because the first surface 531a of the inner tooth 531 is formed on an inclined surface inclining to the downstream side as going outward in the radial direction with respect to the direction of the gear member 50 rotating toward the one side, the pawl portion 311 can more smoothly withdraw from the inner tooth 531 when the gear member 50 rotates toward the one side.

Figure 7B:
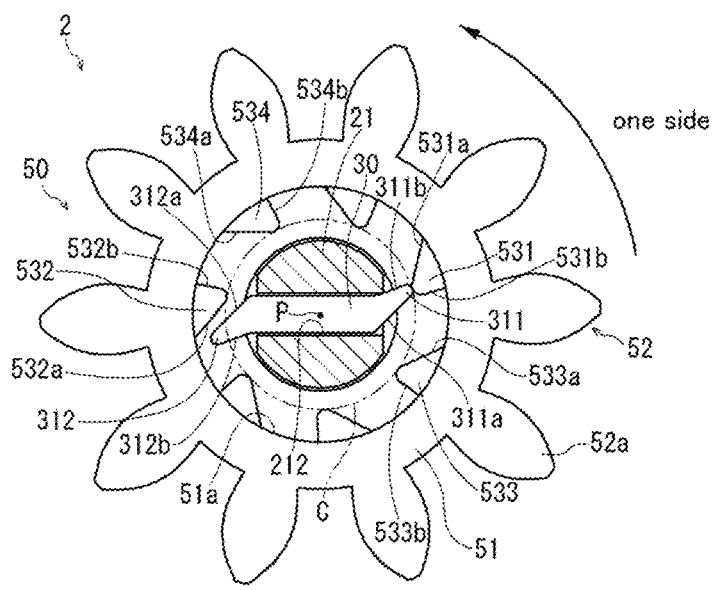

As illustrated in FIG. 7B, the slide member 30 slides toward the pawl portion 312 until the pawl portion 311 does not protrude outside of the circle C by the pawl portion 311 being pressed by the inner tooth 531 of the gear member 50 that rotates toward the one side.

After the slide member 30 slides until the pawl portion 311 does not protrude outside of the circle C, the inner tooth 531 does not mesh with the pawl portion 311 and moves toward further downstream than the pawl portion 311 with respect to the direction of the gear member 50 rotating toward the one side.

When the slide member 30 is in a slide position in which the pawl portion 311 does not protrude outside of the circle C, the pawl portion 312 protrudes outside of the circle C.

Figure 8:
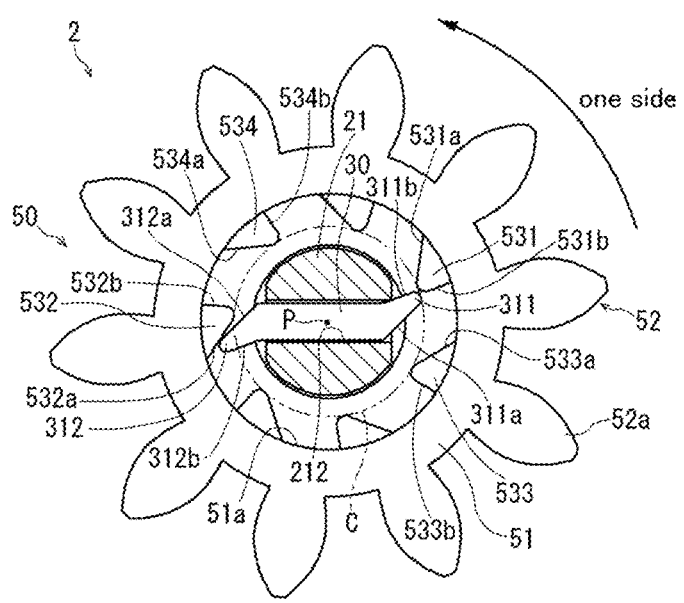
FIG. 8 is a diagram illustrating operation of the one-way clutch in a case where the gear member rotates toward the one side with respect to the rotor shaft, and is a diagram illustrating a state where another pawl portion positioned outside of the circle C in the radial direction abuts the inner tooth.

As illustrated in FIG. 8, when the gear member 50 further rotates toward the one side, the inner tooth 532 of the gear member 50 abuts the pawl portion 312 positioned opposite to the pawl portion 311. When the gear member 50 rotates toward the one side after the inner tooth 532 abuts the pawl portion 312, the pawl portion 312 is pressed by the inner tooth 532 and the pawl portion 312 withdraws from the inner tooth 532 inward in the radial direction, and the slide member 30 slides toward the pawl portion 311.

The slide member 30 slides until the pawl portion 312 does not protrude outside of the circle C. Then, without meshing with the pawl portion 312, the inner tooth 532 moves toward further downstream than the pawl portion 312 with respect to the direction of the gear member 50 rotating toward the one side.

After that, when the gear member 50 further rotates toward the one side, the inner tooth 533 of the gear member 50 abuts the pawl portion 311, and the slide member 30 slides toward the pawl portion 312 until the pawl portion 311 does not protrude outside of the circle C. When the gear member 50 further rotates toward the one side, the inner tooth 534 of the gear member 50 abuts the pawl portion 312, and the slide member 30 slides toward the pawl portion 311 until the pawl portion 312 does not protrude outside of the circle C.

Thus, the structure is such that, in a case where the gear member 50 rotates toward the one side, the inner teeth 53 of the gear member 50 alternately abut the pawl portion 311 and pawl portion 312 of the slide member 30, and when the inner teeth 53 abut the pawl portions 311, 312, the pawl portions 311, 312 withdraw from the inner teeth 53, and the slide member 30 slides toward the pawl portion 312 and the pawl portion 3111 alternately with respect to the sliding direction. With this arrangement, the inner teeth 53 of the gear member 50 do not engage with the pawl portions 311, 312 of the slide member 30, and the gear member 50 rotates independently of the rotor shaft 20.

Because the gear member 50 rotates independently of the rotor shaft 20, and a rotor shaft 62 does not rotate, the gear member 50 rotates without being provided with rotational resistance.

Next, operation of the one-way clutch 2 in a case where the gear member 50 rotates toward the other side with respect to the rotor shaft 20 will be described.

Figure 9A:
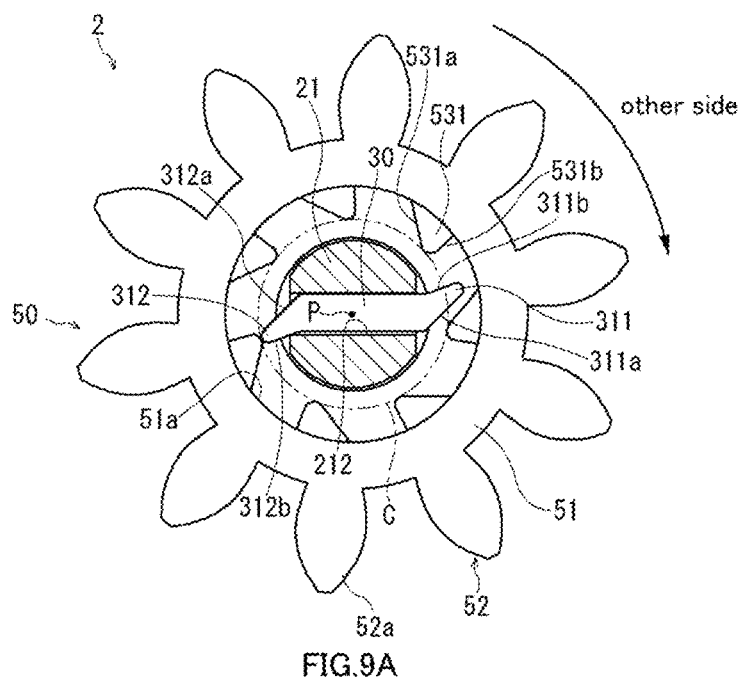
FIG. 9A and FIG. 9B are diagrams illustrating operation of the one-way clutch in a case where the gear member rotates toward the other side with respect to the rotor shaft.

FIG. 9A illustrates a state where the pawl portion 311 is positioned outside of the circle C in the radial direction, and the pawl portion 312 does not protrude outside of the circle C in the radial direction. In the state illustrated in FIG. 9A, the inner tooth 531 is positioned closer to the upstream side than the pawl portion 311 is with respect to the direction of the gear member 50 rotating toward the other side.

Figure 9B:
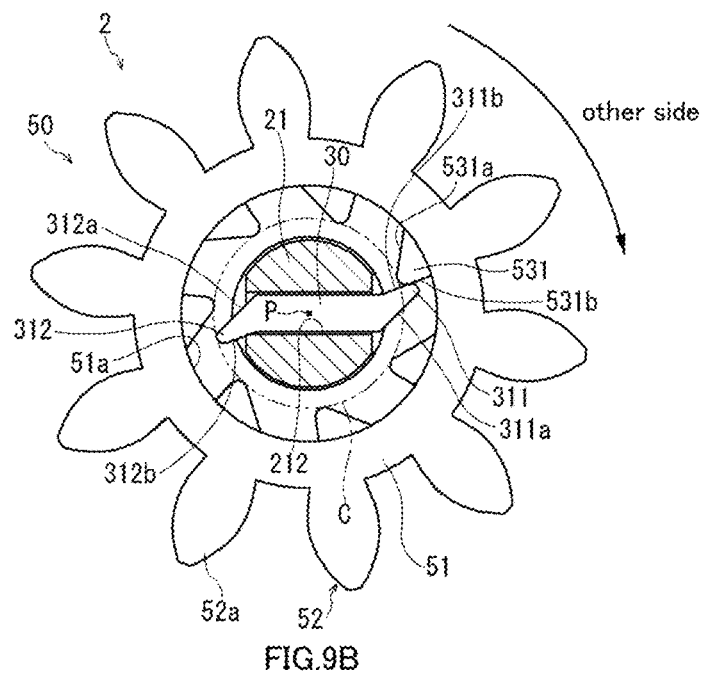

When the gear member 50 rotates toward the other side with respect to the rotor shaft 20 from this state, as illustrated in FIG. 9B, the inner tooth 531 of the gear member 50 abuts the pawl portion 311, and the inner tooth 531 and the pawl portion 311 engage with each other.

Figure 10:
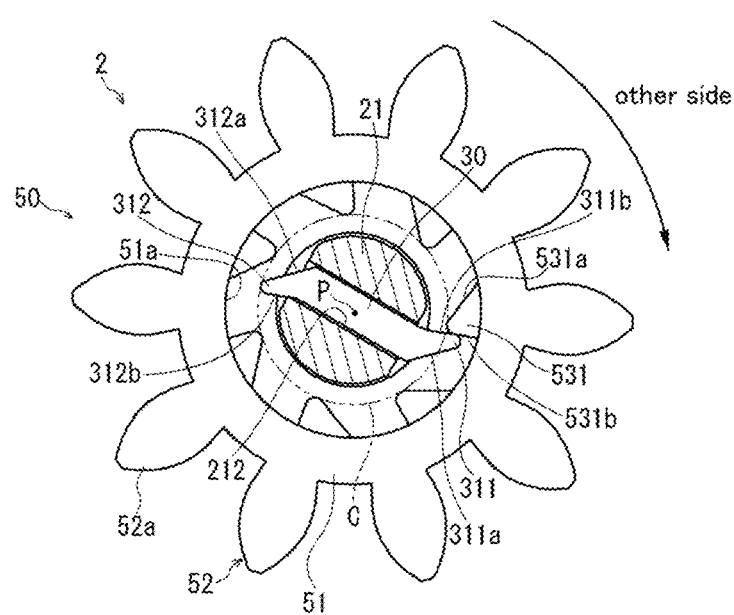
FIG. 10 is a diagram illustrating operation of the one-way clutch in a case where the gear member rotates toward the other side with respect to the rotor shaft, and is a diagram illustrating a state where the rotor shaft and the gear member rotate integrally after one pawl portion and an inner tooth are engaged with each other.

As illustrated in FIG. 10, when the gear member 50 rotates toward the other side after the inner tooth 531 and the pawl portion 311 are engaged with each other, the slide member 30 does not slide in the sliding direction, a state of the inner tooth 531 and the pawl portion 311 being engaged with each other is maintained, and the rotor shaft 20 rotates integrally with the gear member 50. When the rotor shaft 20 rotates integrally with the gear member 50, rotational resistance by the viscous fluid 60, which is provided to the rotor shaft 62 when the rotor shaft 62 rotates, is also transmitted to the gear member 50.

In this case, a second surface 531b of the inner tooth 531 abuts an engaging surface 311b of the pawl portion 311. However, because the engaging surface 311b is formed on an inclined surface inclining to the upstream side as going outward in the radial direction with respect to the direction of the gear member 50 rotating toward the other side, a state of the inner tooth 531 and the pawl portion 311 being engaged with each other can be easily maintained when the gear member 50 rotates toward the other side with respect to the rotor shaft 20.

Further, because the second surface 531b of the inner tooth 531 is formed on an inclined surface inclining to the upstream side as going outward in the radial direction with respect to the direction of the gear member 50 rotating toward the other side, the inner tooth 531 and the pawl portion 311 can reliably engage with each other when the gear member 50 rotates toward the other side with respect to the rotor shaft 20.

Furthermore, in a one-way clutch of the rotating damper device 1, the slide member 30 is formed such that the dimension L between the tip end of the pawl portion 311 and the tip end of the pawl portion 312 is more than the diameter R of the circle C, and at least either one of the pawl portions 311, 312 is positioned outside of the circle C. Therefore, in a case where the gear member 50 rotates toward the other side with respect to the rotor shaft 20, irrespective of a slide position of the slide member 30, the engaging surface 311b of the pawl portion 311 or an engaging surface 312b of the pawl portion 312 and the second surface 53b of an inner tooth 53 can reliably engage with each other, and the gear member 50 and the rotor shaft 20 can rotate integrally.

Furthermore, the one-way clutch 2 is structured so that a state where the gear member 50 and the rotor shaft 20 engage with each other and a state where the gear member 50 and the rotor shaft 20 do not engage with each other can be switched by the pawl portions 31 of the slide member 30 slidably provided in the rotor shaft 20. Therefore, it is possible to reduce a size of the one-way clutch as compared to a case where, for example, the one-way clutch is structured such that a plurality of planetary gears is housed inside the outer member.

Thus, in a case where a size of the one-way clutch 2 is reduced, the outer tooth gear 52 of the gear member 50 can be structured with fewer outer teeth 52a. Therefore, when a gear that transmits rotational force to the rotor shaft 20 is meshed with the outer tooth gear 52, rotational resistance with respect to the rotor shaft 20 generated in the rotating damper device 1 can be increased by increasing a rotation rate of the rotor shaft 20, by which usability of the rotating damper device 1 connected to the one-way clutch 2 can be improved.

Furthermore, in the one-way clutch 2, the rotor shaft 20 supports the gear member 50 and the slide member 30. Therefore, another member to support the gear member 50 and the slide member 30 is not required, and the number of parts included in the one-way clutch 2 can be reduced.

Particularly, because the gear member 50 is supported by the rotor shaft 20 by fitting the groove portion 214 of the rotor shaft 20 and the protrusion portion 55 of the gear member 50, another member to support the gear member 50 is not required, and the number of parts included can be reduced.

This also applies to a case where the rotor shaft 20 is formed with a protrusion portion, and a gear member 50 is formed with a groove portion fitting to the protrusion portion.

Furthermore, because the rotor shaft 20 is divided into a plurality of shaft piece portions 21A by the slit 213, and the groove portion 214 is formed in an outer peripheral surface of a shaft piece portion 21A, the shaft piece portions 21A of the rotor shaft 20 are bent when the protrusion portion 55 of the gear member 50 is fitted to the groove portion 214 of the rotor shaft 20, by which fitting work can be facilitated.

Further, because the slide member 30 is slidably supported by the rotor shaft 20 by being inserted into the insertion hole 212 of the rotor shaft 20, it possible to support the slide member 30 with a simple structure.

[Another Embodiment of Slide Member]

The slide member 30 is structured such that a pawl portion 31 projects further than a side surface 30a toward the engaging surface 31b with respect to a direction orthogonal to the sliding direction of the slide member 30 and orthogonal to the side surface 30a. However, a slide member may be structured such that a pawl portion does not project from a side surface of the slide member.

Figure 11:
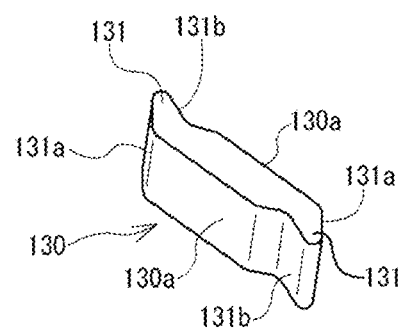
FIG. 11 is a perspective view illustrating another embodiment of a slide member.
Figure 12:
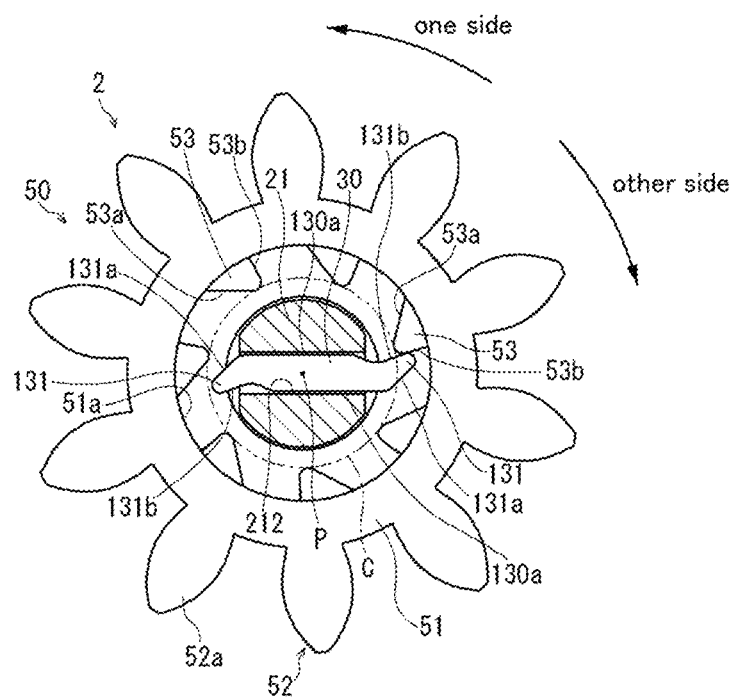
FIG. 12 is a cross-sectional bottom view illustrating a one-way clutch including the slide member according to another embodiment.

For example, a slide member 130 illustrated in FIGS. 11 and 12 is slidably inserted into the insertion hole 212 of the extension shaft 21 in the radial direction orthogonal to the direction of the shaft center P. The slide member 130 is supported by the rotor shaft 20 by being inserted into the insertion hole 212, and is structured to be rotatable integrally with the rotor shaft 20 around the shaft center P. The slide member 130 has a pair of side surfaces 130a that extends along the sliding direction.

The slide member 130 has pawl portions 131 projecting outward in the radial direction at both end portions with respect to the sliding direction.

A pawl portion 131 has a withdrawal surface 131a arranged at the upstream side with respect to a direction of the gear member 50 rotating toward the one side, and an engaging surface 131b arranged further downstream than the withdrawal surface 131a is with respect to a direction of the gear member 50 rotating toward the one side. The withdrawal surface 131a is formed on an inclined surface inclining to the downstream side as going outward in the radial direction with respect to the direction of the gear member 50 rotating toward the one side. The engaging surface 131b is formed on an inclined surface inclining to the upstream side as going outward in the radial direction with respect to the direction of the gear member 50 rotating toward the other side.

With respect to a direction orthogonal to the sliding direction of the slide member 130 and orthogonal to the side surface 130a, the pawl portions 131 are set within an area of the pair of side surfaces 130a, and do not project from the side surfaces 130a toward the engaging surface 131b and the withdrawal surface 131a.

Thus, because the pawl portions 131 are set within an area of the pair of side surfaces 130a in the slide member 130, a pawl portion 131 does not interfere with the insertion hole 212 when the slide member 130 is inserted into the insertion hole 212 of the extension shaft 21. Therefore, work to insert the slide member 130 into the insertion hole 212 can be facilitated.

[Another Embodiment of Rotor Shaft]

The rotor shaft 20 may be structured as described below.

Figure 13:
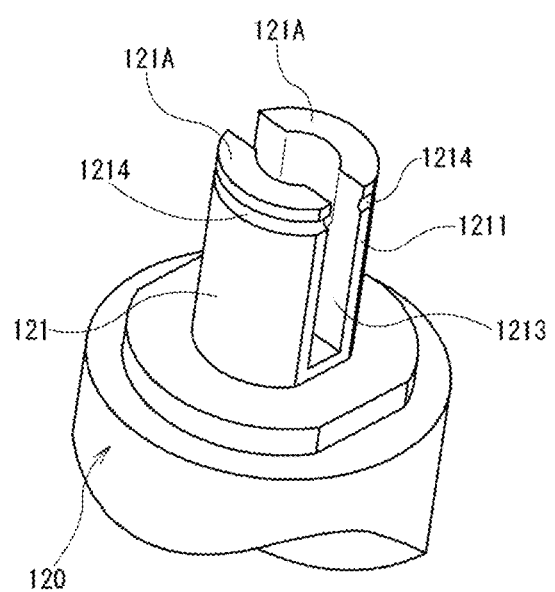
FIG. 13 is a perspective view illustrating another embodiment of a rotor shaft.

For example, a rotor shaft 120 illustrated in FIG. 13 has an extension shaft 121 that is a portion projecting outside of the housing 10.

The extension shaft 121 is formed in a substantially columnar shape having an outer peripheral surface chamfered on two sides, and has a pair of chamfered portions 1211. The pair of chamfered portions 1211 is formed in a flat shape and is arranged in parallel to each other.

The extension shaft 121 is formed with a slit 1213 from a tip end portion of the extension shaft 121 to the housing 10 with respect to the direction of the shaft center P. The slit 1213 is formed so as to communicate between the pair of chamfered portion 1211 and chamfered portion 1211 with respect to the radial direction. Furthermore, the slit 1213 is formed from the tip end portion of the extension shaft 121 to the end portion on the housing 10 side.

The extension shaft 121 has a plurality of shaft piece portions 121A divided by the slit 1213 in the circumferential direction. That is, the tip end portion of the extension shaft 121 is divided into the plurality of shaft piece portions 121A by the slit 1213.

The slide member 30 can be slidably inserted into the slit 1213 of the extension shaft 121 in the radial direction. The slide member 30 is supported by the rotor shaft 120 by being inserted into the slit 1213, and is rotatable integrally with the rotor shaft 120 around the shaft center P.

In an outer peripheral surface of a shaft piece portion 121A of the extension shaft 121, a groove portion 1214 recessed inward in the radial direction is formed. The groove portion 1214 extends along the circumferential direction. In the present embodiment, the groove portion 1214 is formed over an entire area of the shaft piece portion 121A with respect to the circumferential direction.

The slit 1213 of the extension shaft 121 is formed in a shape similar to a shape in which the insertion hole 212 of the extension shaft 21 and the slit 213 communicate with each other in the direction of the shaft center P, and the slide member 30 can be inserted into the slit 1213 from the tip end of the extension shaft 121 toward the housing 10.

Thus, by forming the slit 1213 in the extension shaft 121, the slide member 30 can be inserted into the slit 1213 from the tip end of the extension shaft 121. Therefore, work to insert the slide member 30 into the slit 1213 can be facilitated.

INDUSTRIAL APPLICABILITY

The present invention can be applied to a one-way clutch and a one-way clutch-equipped rotating damper device.

REFERENCE SIGNS LIST

1 One-way clutch-equipped rotating damper device
2 One-way clutch
10 Housing
10A Housing main body
20 Rotor shaft
21 Extension shaft
21A Shaft piece portion
25 Rotor blade
30 Slide member
30a Side surface
31 Pawl portion
31a Withdrawal surface
31b Engaging surface
50 Gear member
51 Gear main body
52 Outer tooth gear
52a Outer tooth
53 Inner tooth
53a First surface
53b Second surface
55 Protrusion portion
60 Viscous fluid
211 Chamfered portion
212 Insertion hole
213 Slit
214 Groove portion
C Circle (passing tip end of each inner tooth)
L Dimension (between tip end of one pawl portion and tip end of another pawl portion)
P Shaft center
R Diameter (of circle)

The invention claimed is:

1. A one-way clutch comprising:
a rotary shaft rotatable around a shaft center;
a slide member that is supported by the rotary shaft slidably to a radial direction orthogonal to a direction of the shaft center, is rotatable around the shaft center integrally with the rotary shaft, and has, on both end portions of a sliding direction, pawl portions projecting outward in the radial direction; and
a gear member having a cylindrical member that is supported by the rotary shaft relatively rotatable around the shaft center and houses the slide member, a plurality of outer teeth projecting outward in the radial direction from an outer peripheral surface of the cylindrical member, and a plurality of inner teeth projecting inward in the radial direction from an inner peripheral surface of the cylindrical member;
wherein
a groove portion is formed in one of an outer peripheral surface of the rotary shaft and one side of an inner peripheral surface of the cylindrical member in the gear member,
a protrusion portion fittable to the groove portion is formed on the other one of the outer peripheral surface of the rotary shaft and the inner peripheral surface of the cylindrical member in the gear member,
the gear member is supported by the rotary shaft by the groove portions and the protrusion portions fitting to each other,
a dimension between a tip end of one pawl portion and a tip end of another pawl portion is more than a diameter of a circle that is centered at the shaft center and passes through the tip ends of the plurality of inner teeth,
the pawl portion has a withdrawal surface that abuts the inner teeth by the gear member rotating toward one side with respect to the rotary shaft and an engaging surface that abuts the inner teeth by the gear member rotating toward an other side with respect to the rotary shaft,
the slide member slides in the sliding direction, the pawl portion withdraws from the inner teeth and the gear member rotates independently of the rotary shaft in a case where the inner teeth and the withdrawal surface abut each other when the gear member rotates toward the one side, and the inner teeth and the engaging surface engage with each other and the gear member and the rotary shaft rotate integrally in a case where the inner teeth and the engaging surface abut each other when the gear member rotates toward the other side,
the rotary shaft has a plurality of shaft piece portions divided in a circumferential direction by a slit formed along a direction of the shaft center from a tip end portion of the rotary shaft, and the groove portion is formed in an outer peripheral surface of the shaft piece portions,
the slit is provided to bend the shaft piece portions when the protrusion portion is fitted to the groove portion.

2. The one-way clutch according to claim 1,
wherein the rotary shaft has an insertion hole into which the slide member is slidably inserted, the insertion hole penetrating in the radial direction,
the insertion hole is arranged at the base end side of the rotary shaft with respect to the slit.

3. The one-way clutch according to claim 2,
wherein the withdrawal surface is formed on an inclined surface inclining to a downstream side as going outward in the radial direction with respect to a direction of the gear member rotating toward the one side, and
the engaging surface is formed on an inclined surface inclining to an upstream side as going outward in the radial direction with respect to a direction of the gear member rotating toward the other side.

4. The one-way clutch according to claim 3,
wherein the inner teeth have a first surface that abuts the pawl portion by the gear member rotating toward the one side with respect to the rotary shaft and a second surface that abuts the pawl portion by the gear member rotating toward the other side with respect to the rotary shaft, and
the first surface is formed on an inclined surface inclining to the downstream side as going outward in the radial direction with respect to the direction of the gear member rotating toward the one side, and
the second surface is formed on an inclined surface inclining to the upstream side as going outward in the radial direction with respect to the direction of the gear member rotating toward the other side.

5. The one-way clutch according to claim 4,
wherein the slide member has a pair of side surfaces that extends along a sliding direction between the pawl portions of the both end portions, the pair of side surfaces slide abutting each inner surface of the insertion holes.

6. A one-way clutch-equipped rotating damper device comprising:
the one-way clutch according to claim 5;
a housing into which the rotary shaft of the one-way clutch is inserted;
a rotor blade that is housed in the housing and rotatable around the shaft center integrally with the rotary shaft; and
viscous fluid that is enclosed in the housing and provides rotational resistance to the rotor blade.

7. A one-way clutch-equipped rotating damper device comprising:
the one-way clutch according to claim 4;
a housing into which the rotary shaft of the one-way clutch is inserted;
a rotor blade that is housed in the housing and rotatable around the shaft center integrally with the rotary shaft; and
viscous fluid that is enclosed in the housing and provides rotational resistance to the rotor blade.

8. The one-way clutch according to claim 3,
wherein the slide member has a pair of side surfaces that extends along a sliding direction between the pawl portions of the both end portions, the pair of side surfaces slide abutting each inner surface of the insertion holes.

9. A one-way clutch-equipped rotating damper device comprising:
the one-way clutch according to claim 8;
a housing into which the rotary shaft of the one-way clutch is inserted;
a rotor blade that is housed in the housing and rotatable around the shaft center integrally with the rotary shaft; and
viscous fluid that is enclosed in the housing and provides rotational resistance to the rotor blade.

10. A one-way clutch-equipped rotating damper device comprising:
the one-way clutch according to claim 3;
a housing into which the rotary shaft of the one-way clutch is inserted;
a rotor blade that is housed in the housing and rotatable around the shaft center integrally with the rotary shaft; and
viscous fluid that is enclosed in the housing and provides rotational resistance to the rotor blade.

11. The one-way clutch according to claim 2,
wherein the inner teeth have a first surface that abuts the pawl portion by the gear member rotating toward the one side with respect to the rotary shaft and second surface that abuts the pawl portion by the gear member rotating toward the other side with respect to the rotary shaft, and
the first surface is formed on an inclined surface inclining to the downstream side as going outward in the radial direction with respect to the direction of the gear member rotating toward the one side, and
the second surface is formed on an inclined surface inclining to the upstream side as going outward in the radial direction with respect to the direction of the gear member rotating toward the other side.

12. The one-way clutch according to claim 11,
wherein the slide member has a pair of side surfaces that extends along a sliding direction between the pawl portions of the both end portions, the pair of side surfaces slide abutting each inner surface of the insertion holes.

13. A one-way clutch-equipped rotating damper device comprising:
the one-way clutch according to claim 12;
a housing into which the rotary shaft of the one-way clutch is inserted;
a rotor blade that is housed in the housing and rotatable around the shaft center integrally with the rotary shaft; and
viscous fluid that is enclosed in the housing and provides rotational resistance to the rotor blade.

14. A one-way clutch-equipped rotating damper device comprising:
the one-way clutch according to claim 11;
a housing into which the rotary shaft of the one-way clutch is inserted;
a rotor blade that is housed in the housing and rotatable around the shaft center integrally with the rotary shaft; and
viscous fluid that is enclosed in the housing and provides rotational resistance to the rotor blade.

15. The one-way clutch according to claim 2,
wherein the slide member has a pair of side surfaces that extends along a sliding direction between the pawl portions of the both end portions, the pair of side surfaces slide abutting each inner surface of the insertion holes.

16. A one-way clutch-equipped rotating damper device comprising:
the one-way clutch according to claim 15;
a housing into which the rotary shaft of the one-way clutch is inserted;
a rotor blade that is housed in the housing and rotatable around the shaft center integrally with the rotary shaft; and
viscous fluid that is enclosed in the housing and provides rotational resistance to the rotor blade.

17. A one-way clutch-equipped rotating damper device comprising:
the one-way clutch according to claim 2;
a housing into which the rotary shaft of the one-way clutch is inserted;
a rotor blade that is housed in the housing and rotatable around the shaft center integrally with the rotary shaft; and
viscous fluid that is enclosed in the housing and provides rotational resistance to the rotor blade.

18. The one-way clutch according to claim 1,
wherein the withdrawal surface is formed on an inclined surface inclining to a downstream side as going outward in the radial direction with respect to a direction of the gear member rotating toward the one side, and
the engaging surface is formed on an inclined surface inclining to an upstream side as going outward in the radial direction with respect to a direction of the gear member rotating toward the other side.

19. A one-way clutch according to claim 18,
wherein the inner teeth have a first surface that abuts the pawl portion by the gear member rotating toward the one side with respect to the rotary shaft and a second surface that abuts the pawl portion by the gear member rotating toward the other side with respect to the rotary shaft, and
the first surface is formed on an inclined surface inclining to the downstream side as going outward in the radial direction with respect to the direction of the gear member rotating toward the one side, and the second surface is formed on an inclined surface inclining to the upstream side as going outward in the radial direction with respect to the direction of the gear member rotating toward the other side.

20. The one-way clutch according to claim 19, wherein the slide member has a pair of side surfaces that extends along a sliding direction between the pawl portions of the both end portions, the pair of side surfaces slide abutting each inner surface of the insertion holes.

21. A one-way clutch-equipped rotating damper device comprising:
the one-way clutch according to claim 20;
a housing into which the rotary shaft of the one-way clutch is inserted;
a rotor blade that is housed in the housing and rotatable around the shaft center integrally with the rotary shaft; and
viscous fluid that is enclosed in the housing and provides rotational resistance to the rotor blade.

22. A one-way clutch-equipped rotating damper device comprising:
the one-way clutch according to claim 19;
a housing into which the rotary shaft of the one-way clutch is inserted;
a rotor blade that is housed in the housing and rotatable around the shaft center integrally with the rotary shaft; and
viscous fluid that is enclosed in the housing and provides rotational resistance to the rotor blade.

23. The one-way clutch according to claim 18, wherein the slide member has a pair of side surfaces that extends along a sliding direction between the pawl portions of the both end portions, the pair of side surfaces slide abutting each inner surface of the insertion holes.

24. A one-way clutch-equipped rotating damper device comprising:
the one-way clutch according to claim 23;
a housing into which the rotary shaft of the one-way clutch is inserted;
a rotor blade that is housed in the housing and rotatable around the shaft center integrally with the rotary shaft; and
viscous fluid that is enclosed in the housing and provides rotational resistance to the rotor blade.

25. A one-way clutch-equipped rotating damper device comprising:
the one-way clutch according to claim 18;
a housing into which the rotary shaft of the one-way clutch is inserted;
a rotor blade that is housed in the housing and rotatable around the shaft center integrally with the rotary shaft; and
viscous fluid that is enclosed in the housing and provides rotational resistance to the rotor blade.

26. The one-way clutch according to claim 1, wherein the inner teeth have a first surface that abuts the pawl portion by the gear member rotating toward the one side with respect to the rotary shaft and a second surface that abuts the pawl portion by the gear member rotating toward the other side with respect to the rotary shaft, and the first surface is formed on an inclined surface inclining to the downstream side as going outward in the radial direction with respect to the direction of the gear member rotating toward the one side, and the second surface is formed on an inclined surface inclining to the upstream side as going outward in the radial direction with respect to the direction of the gear member rotating toward the other side.

27. The one-way clutch according to claim 26, wherein the slide member has a pair of side surfaces that extends along a sliding direction between the pawl portions of the both end portions, the pair of side surfaces slide abutting each inner surface of the insertion holes.

28. A one-way clutch-equipped rotating damper device comprising:
the one-way clutch according to claim 27;
a housing into which the rotary shaft of the one-way clutch is inserted;
a rotor blade that is housed in the housing and rotatable around the shaft center integrally with the rotary shaft; and
viscous fluid that is enclosed in the housing and provides rotational resistance to the rotor blade.

29. A one-way clutch-equipped rotating damper device comprising:
the one-way clutch according to claim 26;
a housing into which the rotary shaft of the one-way clutch is inserted;
a rotor blade that is housed in the housing and rotatable around the shaft center integrally with the rotary shaft; and
viscous fluid that is enclosed in the housing and provides rotational resistance to the rotor blade.

30. A one-way clutch-equipped rotating damper device comprising:
the one-way clutch according to claim 1;
a housing into which the rotary shaft of the one-way clutch is inserted;
a rotor blade that is housed in the housing and rotatable around the shaft center integrally with the rotary shaft; and
viscous fluid that is enclosed in the housing and provides rotational resistance to the rotor blade.

* * * * *